United States Patent [19]
Victor

[11] 3,870,280
[45] Mar. 11, 1975

[54] HIGH LINE TOWING DEVICE
[76] Inventor: Leslie E. Victor, 120 Lunden Dr., Ventura, Calif. 93003
[22] Filed: July 26, 1974
[21] Appl. No.: 492,341

[52] U.S. Cl. ......................................... 254/134.3 R
[51] Int. Cl. ........................................... E21c 29/16
[58] Field of Search ............ 254/134.3 CL, 134.3 R; 57/10

[56] References Cited
UNITED STATES PATENTS
2,153,072   4/1939   Bookout et al. ........... 254/134.3 CL
3,162,992   12/1964  Davis et al. .............................. 57/10
3,259,370   7/1966   Neale, Sr. ................... 254/134.3 CL Primary Examiner—Othell M. Simpson
Attorney, Agent, or Firm—Pastoriza & Kelly

[57] ABSTRACT

A self propelled towing device is capable of traversing and being suspended from a messenger line used for installing electrical cable. Releasable drive gears drivingly engage opposite sides of the messenger line thrusting the towing device forwardly as a hitch pulls electrical lines or other equipment along.

19 Claims, 7 Drawing Figures

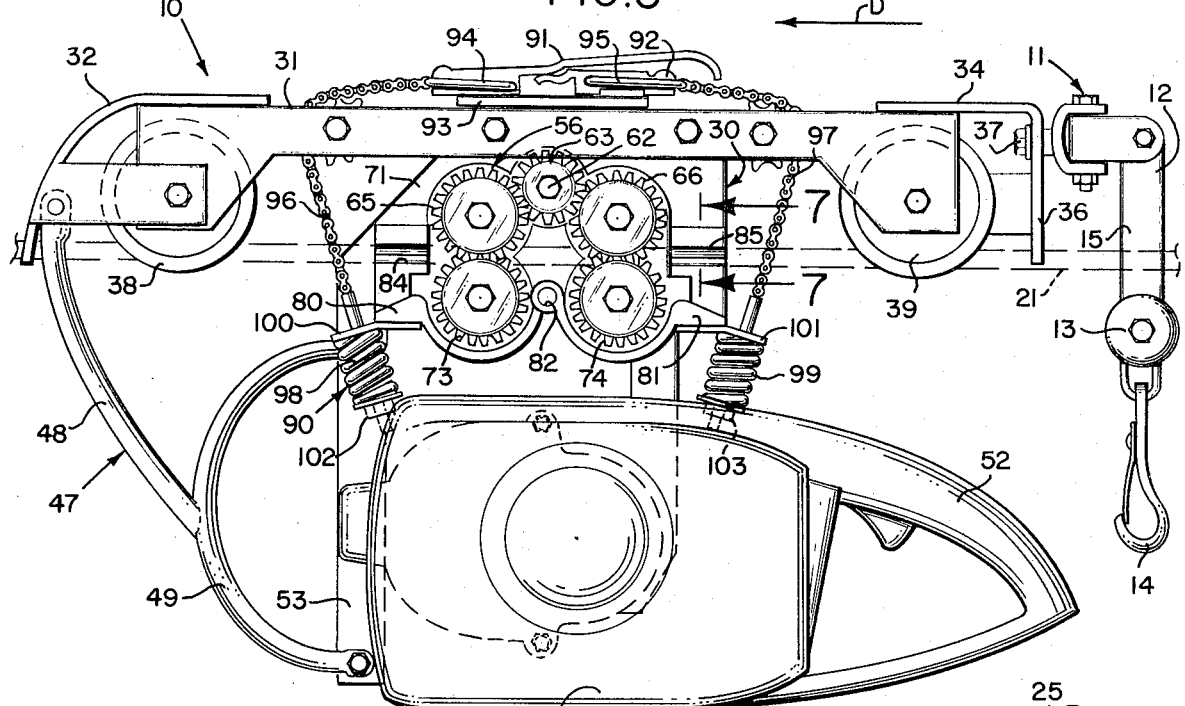
FIG. 5
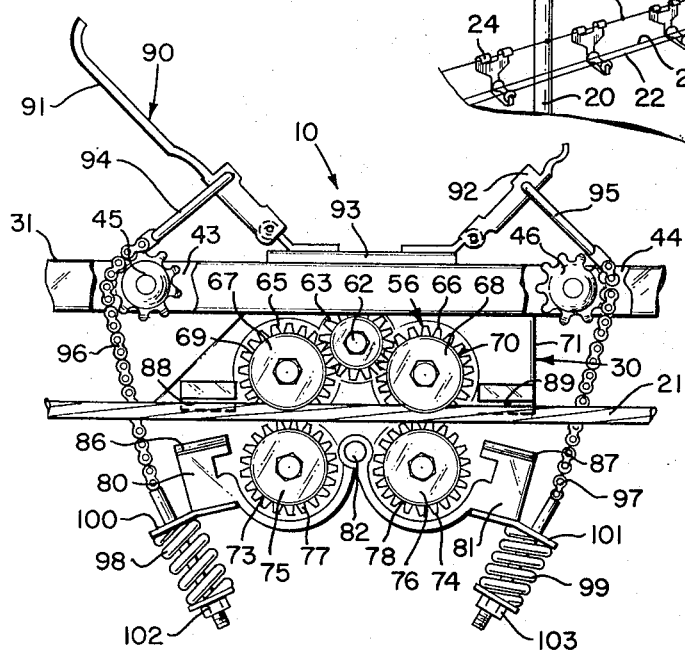
FIG. 6
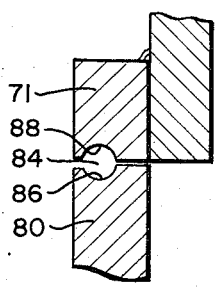
FIG. 7
FIG. 1

HIGH LINE TOWING DEVICE

BACKGROUND OF THE INVENTION

THis invention relates generally to the installation of high or suspended lines and more specifically to towing equipment for installing electrical cable.

The customary procedures for installing electrical transmission cables between fixed points such as by suspending them between poles are time consuming and cumbersome. In addition the standard practices followed for example by telephone company linemen, utility company workmen and cable TV installers require excessive manpower and often creat traffic snarls and unacceptable risks to people and equipment.

Generally a "messenger" line or support cable must first be strung between selected points of consecutive poles in a row of poles. Thereafter under conventional approaches, a transmission line is continuously drawn from a supply reel on the ground and gradually aligned beneath and parallel to the messenger line.

The process for accomplishing this is tedious, requiring that the free or leading end of the transmission line be secured to a service truck or some holding device on the truck. The service truck travels slowly, pulling the transmission line from the reel and causing segments of it to be progressively laid in pulley blocks or hangers loosely hooked at longitudinally spaced points to the overhead messenger line. This operation must often be repeated if additonal transmission lines are to be included in the eventual package or electrical cable.

After the transmission line or transmission lines are thus positioned, a wrapping machine or lasher is mounted for travel along the messenger line and secured to the service truck by way of a linking tow line. The service truck again travels slowly while towing the lasher along as it spirally wraps a binding wire around both the messenger line and all of the transmission lines, forcing them toegther as a bundle constituting the electrical cable.

While traversing along the messenger line, the lasher clears away the termporary pulley blocks by bumping them forwardly to the next pole where they are collected by a lineman for further use. See U.S. Pat. No. 3,134,575 to Walter.

During the steps of laying the transmission lines in the pulley blocks and towing the lasher, a truck and at least one active person at ground level are necessitated. When the electrical cable is thus installed, either initially or during repair, either at street intersections or busy street zones, normal traffic flow is impeded.

During conditions where the service truck access is impossible due to rough terrain, narrow passage, perilous conditions, obstructions, etc., one or more mean are required to normally pull the transmission lines and tow the lasher in any manner that is mangageable. This requires hard and slow manual labor and can be hazardous depending on the particular access problem.

The self-propelled towing device of this invention helps to overcome these drawbacks that exist in connection with conventional electrical cable installation procedures.

SUMMARY OF THE INVENTION

Briefly stated, this invention comprehends a towing device for pulling electrical lines and equipment along a messenger line and eliminating the need for customary direct manual work and service truck coordination at ground level.

In its broader aspects this invention is a high line towing device capable of travelling along while being suspended from a messenger line or support line. The towing device includes a framework and an overhead mounting bar secured to a top portion of the framework. A pair of support sheaves is carried by relatively forward and rearward portions of the overhead mounting bar and they are formed with guide grooves. These guide grooves define an imaginary axis of travel along the messenger line.

A self-contained motor has an output shaft and the motor is slung beneath the axis of travel and arranged to assist in load balancing as th towing device traverses the messenger line. The drive shaft is operatively coupled to the power output shaft of the motor.

An upper drive means is coupled to the framework and is operatively engaged with the drive shaft. The lower drive means is coupled to framework at a position beneath the upper drive means. The upper drive means and lower drive means are respectively located above and below the axis of travel.

A drive release mechanism is coupled to the overhead mounting bar and is structured to mutually disengage and drivingly engage the upper and lower driving means.

Preferably the upper drive means includes a pair of pinion gears with drive grooves set on opposite sides of the drive shaft. The lower drive means includes a pair of pinion gears with drive grooves aligned beneath corresponding upper pinion gears. The upper drive grooves and lower drive grooves may be actuated to simultaneously contact and drivingly engage top and bottom segments of the messenger line respectively.

A pair of trays rotatably suppor the lower pinion gears and have adjacent inner end pivoted to the framework at a point beneath the drive shaft and outer ends coupled to the drive release mechanism. The trays and lower pinion gears may be selectiely swung towards and away from the upper pinion gears by operation of the drive release mechanism.

The drive release mechanism preferably includes a pair of spring-loaded tightening levers operatively coupled to corresponding trays and structured for being locked over center against a top portion of the overhead mounting bar. A pair of idler sprockets is carried by the overhead mounting bar. Chain strips are trained over corresponding idler sprockets and interlink the trays and corresponding tightening levers.

A plurality of guide channels are arranged in alignment with te guide grooves. Complimentary guide channel sections are formed by the framework and portions of the trays.

A gear reduction assembly interconnects the motor output shaft and the drive shaft. The motor and gear reduction assembly are aligned to straddle or be on opposite sides of the axis of travel in order to improve stability of the towing device during travel conditions.

The hitch is secured to the overhead mounting bar for pulling equipment and/or electrical wires. The hitch is a swivel coupling that may be attached to a tow line.

BRIEF DESCRIPTION OF THE DRAWINGS

The numerous benefits and unique aspects of the present invention will be fully understood when the following detailed description is studied in conjunction with the drawings in which:

FIG. 1 is a schematic and pictorial view showing a towing device travelling on a messenger line between a couple of telephone poles while pulling a lasher;

FIG. 5 is a side elevational detailed view of the towing device showing the drive release mechanism locked for travel conditions;

FIG. 6 is a side elevational detailed view showing the drive release mechanism opened for non-travel conditions;

FIG. 7 is a fragmentary view showing a guide channel formed by the towing device framework and a tray for carrying a lower pinion gear.

DETAILED DESCRIPTION OF THE PREFERRED EMBODIMENT

Figure 2:
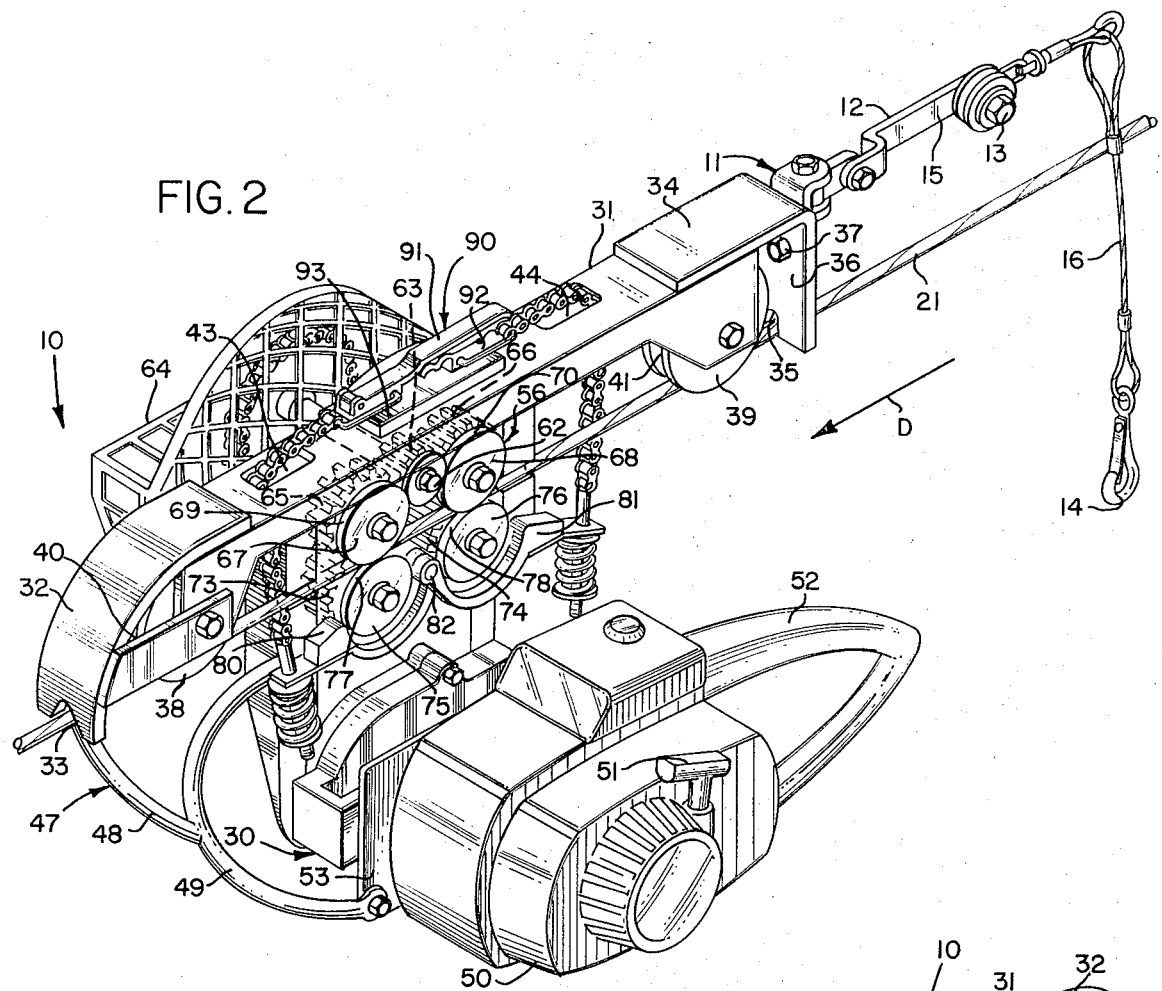
FIG. 2 is a perspective, detailed view showing a towing device constructed in accordance with this invention travelling along a messenger line.

Referring now to FIG. 1 a high line towing device 10 constructed in accordance with this invention has a rear hitch 11 that is preferably a universal joint or swivel coupling. Detachably coupled to the hitch 11 is a tow line 12 that includes an idler sheave 13 and terminates rearwardly in a snap hook coupling 14.

The towing device 10 is shown towing a wrapping machine or lasher 17 between a pair of telephone poles 18 and 19 of the row of telephone poles for support posts 18, 19 and 20. Strung between consecutive poles 18, 19 and 20 is a conventional messenger line or supporting strand 21. Separate electrical transmission lines 22 and 23 are disposed beneath the messenger line 21 and are illustrated as temporarily resting on guide rollers associated with pulley blocks or hangers 24.

A segment of completed or fully package electrical cable 25 is indicated behind lasher 17 which along with the towing device 10 is travelling from right to left as indicated by directional arrow D. Supply reels 26, 27 and 28 are wound with lines of messenger line 21a, electrical transmission line 22a, and another electrical transmission line 23a respectively. A particular benefit derived by using towing device 10 in this general environment will be subsequently explained.

Figure 4:
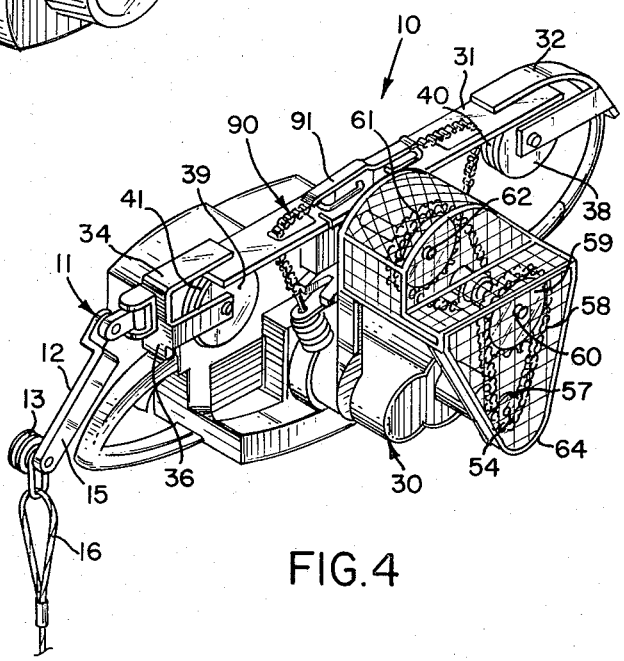
FIG. 4 is generally a rear perspective view of the towing device.

Referring now primarily to FIG. 2 but also to FIGS. 4, 5 and 6, the high line towing device 10 is built on a heavy duty and durable framework 30 which carries an overhead mounting bar 3. A front guard plate 32 of arcuate configuration extends forwardly and then arches downwardly from overhead mounting bar 31 and terminates in an alignment notch 33. As towing device 10 traverses messenger line 21 in direction D the front guard plate 32 tends to burrow or wedge under tree limbs, brush and other obstructions to protect components and smooth forward progress.

A rear guard plate 34 secured to a rear portion of the overhead mounting bar 31 has an alignment notch 35. A depending arm 36 of rear guard plate 34 serves as a bracket for securing hitch 11 by way of a coupling 37. Hitch 11 demountably secures a tow line that may optionally include a relatively rigid link 15 and a relatively flexible link 16 extending from the idler sheave 13.

A pair of relatively forward and rearward support sheaves 38 and 39 are carried by the overhead mounting bar 31 and their circumferential edges are formed with guide grooves 40 and 41 that define, in tandem alignment, an imaginary axis of travel. This axis of travel coincides with and is surrounded by the messenger line 21. A pair of access holes 43 and 44 are formed in relatively forward and rearward top sections of the overhead mounting bar 31 and are partially occupied by idler sprockets 45 and 46 respectively that are pivotally coupled to a side of the mounting bar 31.

A frontal shield 47 includes a protective bar 48 and a lower protective bar 49 that generally extend between front guard plate 32 and a lower section of the framework 30. Frontal shield 47 generally deflects tree limbs, brush and other movable obstructions sideways to protect various components of the towing device 10. The forward and rearward alignment notches 34 and 35 straddle the messenger line 21 to assist in keeping the towing device 10 on track. The protective bars 48 and 49 also serve to stiffen and rigidify the towing device 10 as a unit.

Towing device 10 includes a self contained low slung motor 50 which may be a gasoline engine having a starter 51 and carrying handle 52. Motor 50 is fixed to the general framework 30 by a mounting plate 53. Motor 50 has a power output shaft 54.

Figure 3:
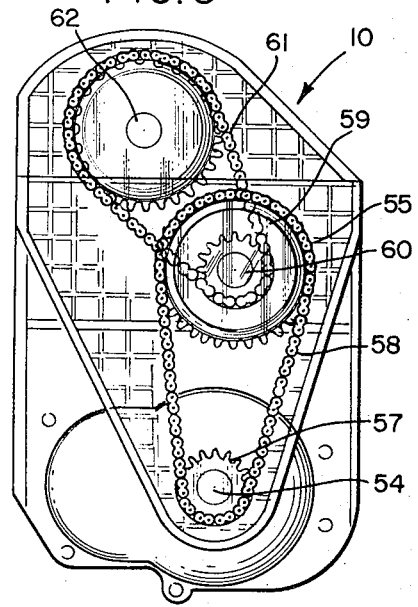
FIG. 3 is a rear elevational view showing a gear reduction assembly.

Referring primarily to FIGS. 3 and 4, the motor 50 is operatively coupled to a reduction gear assembly 55 by way of a power transmission assembly that may include a centrifugal clutch, and speed reducer. The power output shaft 54 or an extension of its rotatably fixed to sprocket 57 around which is trained a chain 58. Chain 58 rotates another sprocket 59 carried by shaft 60. Rotary motion is transmitted by chain 61 and other components to eventually rotate drive shaft 62 carrying a pinion gear 63. The gear reduction assembly 55 is generally protected by a cage 64.

Motor 50 and the gear reduction assembly 55 are generally located on opposite sides of the axis of travel so as to distribute the weight or load of towing device 10 and achieve optimum balancing and stability.

The drive shaft 62 and associated gear 63 transmit rotary motion to a drive means 56. Drive means 56 includes an upper drive means characterized by a pair of pinion gears 65 and 66 that constantly intermesh with gear 63. The upper pinion gears 65 and 66 have outwardly projecting extensions or discs 67 and 68 that are formed with drive grooves 69 and 70. Pinion gears 65 and 66 are journalled to a mounting block 71 that is a part of the framework 30.

A movable lower drive means is characterized by a pair of lower pinion gears 73 and 74 that also carry outwardly projecting extensions or discs 75 and 76 that define drive grooves 77 and 78 respectively. The upper drive grooves 69 and 70 and the lower drive grooves 77 and 78 may be caused to frictionally contact and drivingly engage upper and lower segments of the messenger line 21 respectively. The full weight of towing device 10 is suppoted by the sheaves 38 and 39 and the upper pinion gears 65 and 66 in a four-point rolling contact.

The lower pinion gears 73 and 74 are journalled within carrier trays 80 and 81 whose adjacent inner ends are hinged to a common trunion-like pivot pin 82. Pivot pin 82 is aligned directly beneath drive shaft 62 and the lower pinion gears 73 and 74 are aligned to be brought into meshing engagement with corresponding upper pinion gears 65 and 66 respecitvely. FIG. 5 shows the carrier trays 80 and 81 swung upwardly forcing the pinion gears into meshing engagement while FIG. 6 shows the carrier trays 80 and 81 swung downwardly to retracted positions where the pinion gears are released from one another.

A pair of guide channels 84 and 85 are shown in FIG. 5 that are in general alignment with the guide grooves 40 and 41 associated with the support sheaves 38 and 39. As shown primarily in FIG. 6 and partially in FIG. 7 the guide channels 84 and 85 are defined by lower guide channel sections 86 and 87 formed by carrier trays 80 and 81 and complimentary guide channel sections 88 and 89 cut or cast in mounting block 71. The carrier trays 80 and 81 are actuated selectively by a drive release mechanism 90.

The drive release mechanism 90 is shown in its locked condition in FIGS. 2, 4 and 5 and in its opened and inoperable condition in FIG. 6. It includes relatively elongated and short spring-loaded tightening levers or binders 91 and 92 that can be locked over center and against a mounting pad 93 secured to the mounting bar 31. The over center locking action with lever 91 overlapping lever 92 is a safety feature assuring that the towing device 10 will not become disengaged or out-of-alignment during transit between telephone poles or the like.

Links 94 and 95 are secured to the upper ends of chain strips 96 and 97 whose lower ends are fastened to stop lugs 100 and 101 projecting outwardly from the carrier trays 80 and 81. Interposed between stop lugs 100 and 101 and tension adjusting nuts 102 and 103 are coil springs 98 and 99 respectively. The adjusting nuts 102 and 103 may be manipulated to regulate the tension or binding force with which the levers 91 and 92 may be locked over center.

OPERATION

Keeping the above construction in mind, it can be understood how many of the previously described disadvantages associated with conventional techniques for installing high lines are overcome or substantially eliminated by this invention.

The high line towing device 10 can be used to assist in the installation of electrical cables for telephone lines, cable TV, many utilities and the like. It may also be used, with little or no modification being necessary, to carry or haul suspended loads such as tools, equipment, containers, cargo, etc. along lines strung out between support poles.

For purposes of illustrating one manner in which the two device 10 may be used and operated, it wil be described in connection with installing electrical cables. The linemen first string out a messenger line 21 and pull it taut from pole to pole, 18, 19 and 20.

The towing device 10 is hoisted to a point on the messenger line 21 adjacent pole 18, for example. It is generally and loosely aligned on messenger line 21 with the sheaves 38 and 39 resting on the messenger line 21. Thereafter the drive release mechanism 90 is manipulated to lock the tightening levers 91 and 92 over center. This action causes the pinion gears 65, 66 and 73 and 74 to become drivingly engaged. A transmission line 22a is drawn from its reel and secured to the towing 10 by hitch 11. The motor 50 is started and the towing device 10 is caused to travel along the messenger line 21 pulling the electrical transmission line 22-22a from pole 18 to pole 19.

The motor 50 is turned off by a lineman situated at pole 19 who then repositions the towing device 10 on the other side of pole 19 so it may continue its journey toward pole 20 where another lineman repeats the operation. After the electrical line 22 has been pulled out and laid down, the towing device 10 is unlocked from the messenger line 21 by manipulating the drive release mechanism 90 and is returned to the starting point for pulling the next electrical transmission line 23. The procedure is repeated for as many times as may be necessary, bearing in mind that the towing device 10 may simulatenously pull two or more electrical transmission lines.

When all of the electrical transmission lines, e.g., 22 and 23 have been adequately oriented, then the special and comprehensive tow line 12 is secured to hitch 11 so that the towing device 10 may pull the conventional lasher 17.

Sheave 13, as shown in FIG. 2, is aligned beneath the messenger line 21 so that rigid link 15 is angled downwardly and rearwardly. The tension of this arrangement enables the towing device 10 to a safely and adequately pull the load of lasher 17 while keeping the underlying transmission lines 22 and 23 in proper alignment. The general procedure mentioned above is repeated after which the towing device 10 and lasher 11 are uncoupled from the messenger line 21 and returned to a service truck for future use.

During installation of the elecrical transmission lines 22 and 23 and maneuvering of the lasher 17, no linemean is required to manually exert pulling force from the ground level and furthermore, no service truck is required during the operation of the towing device 10. As a result, potential traffic snarls are avoided and various ground level obstacles will not impede progress.

From the foregoing it will be evident that the present invention has a provided a high line towing device in which all of the various advantages are fully realized.

I claim:

1. A high line towing device capable of travelling along while being suspended from the messenger line, comprising:
   a. a framework;
   b. an overhead mounting bar secured to a top portion of the framework;
   c. a support sheaves carried by forward and rearward portions of the overhead mounting bar and formed with guide grooves, the guide grooves being tandemly aligned to define an imaginary axis of travel along the messenger line;
   d. a motor coupled to the framework and having a power output shaft, the motor being slung beneath the axis of travel and arranged to assist in load balancing;
   e. upper drive means coupled to the framework and operatively engaged to the power output shaft of the motor;
   f. lower drive means coupled to the framework at a position beneath the upper drive means, the upper drive means and lower drive means being respectively located above and below the axis of travel; and, g. a drive release mechanism coupled to the overhead mounting bar and being structured to mutually disengage and drivingly engage the upper and lower driving means.

2. The structure according to claim 1 wherein:
  a. the upper drive means includes a pinion gear with a drive groove for frictionally contacting and drivingly engaging a top portion of the messenger line; and,
  b. the lower drive means includes a pinion gear with a drive groove for frictionally contacting and drivingly engaging a bottom portion of the messenger line.

3. The structure according to claim 2 wherein:
the drive shaft is journalled within the frmework and interconnects the motor and upper driving means;
the upper drive means includes a pair of pinion gears with drive grooves set on opposite sides of the drive shaft; and,
the lower drive means includes a pair of pinion gears with drive grooves set beneath corresponding upper pinion gears.

4. The structure according to claim 3 wherein:
the drive release mechanism is arranged to swing the lower pinion gears into and out of meshing engagement with the upper pinion gears.

5. The structure according to claim 3 including:
a pair of trays rotatably supporting the lower pinion gears and having adjacent inner ends pivoted to the framework at a point beneath the drive shaft and outer ends coupled to the drive release mechanism; and,
wherein the trays and lower pinion gears may be selectively swung towards and away from the upper pinion gears by operation of the drive release mechanism.

6. The structure according to claim 5 wherein the drive releease mechanism includes:
a pair of spring-loaded tightening levers operatively coupled to corresponding trays and structured for being locked over center against a top portion of the overhead mounting bar.

7. The structure according to claim 6 including:
a pair of idler sprockets carried by the overhead mounting bar; and,
chain strips trained over corresponding idler sprockets and interlinking the trays and corresponding tightening levers.

8. The structure according to claim 7 including:
stop lugs secured to the trays;
coil springs mounted beneath the stop lugs; and,
adjustment nuts engaging base portions of the springs for regulating tension and locking force of the tighening levers.

9. The structure according to claim 5 including:
a pluarlity of guide channels in alignment with the guide grooves.

10. The structure according to claim 9 wherein:
complimentary guide channel sections are formed by the framework and parts of the trays.

11. The structure according to claim 1 wherein:
a drive shaft is operatively coupled to the upper drive means; and,
a gear reduction assembly interconnects the motor outpput shaft and drive shaft,
wherein the motor and gear reduction assembly are aligned on opposite sides of the axis of travel and arranged to improve stability of the towing device during travel.

12. The structure according to claim 1 including:
a front guard extending forwardly from the overhead mounting bar to wedge under and deflect obstructions upwardly, the front guard being formed with an alignment notch for travel over the messenger line.

13. The structure according to claim 12 including:
a rear guard extending rearwardly from the overhead mounting bar and having an alignment notch for travel over the messenger line; and,
a frontal shield extending between the front guard and motor to deflect obstructions generally sideways and protect the towing device.

14. The structure according to cliam 1 including:
a hitch secured to the overhead mounting bar for pulling equipment and/or electrical wires.

15. The structure according to claim 14 wherin:
the hitch is a swivel coupling; and,
a tow line is connected to the swivel coupling.

16. The structure according to claim 15 wherein the tow line includes:
an idler sheave;
a rigid link interconnecting the hitch and idler sheave; and,
a flexible link extending rearwardly from the idler sheave, 17. A high line towing device capable of travelling along while being suspended from a messenger line, comprising:
  a. framework;
  b. an overhead mounting bar secured to a top portion of the framework;
  c. support sheaves carried by relatively forward and rearward portions of the overhead mounting bar and being formed with guide grooves, the guide grooves being tandemly aligned to define an imaginary axis of travel along the messenger line;
  d. a drive shaft operatively coupled to the power output shaft of the motor;
  e. a pair of upper pinion gears coupled to the framework and set on opposite sides of the drive shaft, the upper pinion gears being formed with drive grooves for frictionally contacting and drivingly engaging the top portion of the messenger line;
  f. a pair of lower pinion gears coupled to the framework and arranged beneath corresponding upper pinion gears, the lower pinion gears being formed with drive grooves for frictionally contacting and drivingly engaging a bottom portion of the messenger line;
  g. a drive release mechanism coupled to the overhead mounting bar and being structured to mutually disengage and drivingly engage the upper and lower pairs of pinion gears;
  h. a hitch secured to the overhead mounting bar for pulling equipment and/or electrical wires; and,
  i. a gear reduction assembly interconnecting the motor output shaft and drive shaft, the motor and gear reduction assmebly being aligned on opposite sides of the axis of travel and arranged to improve stability of the towing device during travel.

18. The structure according to claim 17 including:
a pair of trays rotatably supporting the lower pinion gears and having adjacent inner ends pivoted to the framework at a point beneath the drive shaft and outer ends coupled to the drive release mechanism; and, wherein the trays and lower pinion gears may be selectively swung towards and away from the upper pinion gears by operation of the drive release mechanism.

19. The structure according to claim 18 wherein the drive release mechanism includes:

a pair of spring-loaded tightening levers operatively coupled to corresponding trays and structured for being locked over center against a top portion of the overhead mounting bar.

* * * * *